March 25, 1958 W. H. BURTON 2,828,004
CONVEYOR MECHANISM FOR TUNNEL KILNS
Filed Oct. 30, 1953 10 Sheets-Sheet 1

FIG.1

Inventor
William Henry Burton
By
Morris & Attorneys
Attorneys

FIG. 3a

March 25, 1958 W. H. BURTON 2,828,004
CONVEYOR MECHANISM FOR TUNNEL KILNS
Filed Oct. 30, 1953 10 Sheets-Sheet 6

Inventor
William Henry Burton
By
Attorneys

March 25, 1958 W. H. BURTON 2,828,004
CONVEYOR MECHANISM FOR TUNNEL KILNS
Filed Oct. 30, 1953 10 Sheets-Sheet 7

FIG. 6

March 25, 1958 W. H. BURTON 2,828,004
CONVEYOR MECHANISM FOR TUNNEL KILNS
Filed Oct. 30, 1953 10 Sheets-Sheet 9

FIG 7

INVENTOR
William Henry Burton
BY
ATTORNEYS

March 25, 1958 W. H. BURTON 2,828,004
CONVEYOR MECHANISM FOR TUNNEL KILNS
Filed Oct. 30, 1953 10 Sheets-Sheet 10

FIG 8

INVENTOR
William Henry Burton
BY
ATTORNEYS

United States Patent Office 2,828,004
Patented Mar. 25, 1958

2,828,004

CONVEYOR MECHANISM FOR TUNNEL KILNS

William Henry Burton, Pendlebury, England, assignor to Pilkington's Tiles Limited, Clifton Junction, England, a body corporate of Great Britain Application October 30, 1953, Serial No. 389,401

3 Claims. (Cl. 198—219)

This invention relates to improvements in tunnel kilns.

In tunnel kilns it has been proposed to traverse tiles and other articles therethrough with the articles carried on batts or slabs but such arrangements are uneconomical in operation due to heat losses in the carriers and the object of the invention is to produce a kiln through which the articles may be traversed step by step without the employment of carriers.

According to the invention a tunnel kiln is constructed with a heating chamber closed along the base by a member carried on a beam given a rectangular movement to traverse the articles through the kiln.

The invention will be described with reference to the accompanying drawings.

Fig. 3a, Figs. 5 and 5a are a plan of same.

The kiln is formed of a refractory material A such as sillimanite surrounded by other refractory material $A^1$. The top of the furnace may be formed with four or other number of longitudinal ducts $a$ (five being shown in the drawings) to house electrical heating units $a^1$. The units comprise electric heating elements which extend longitudinally of the furnace and may be controlled to obtain the required temperature throughout the length of the furnace. The base is formed in three parts, two outer members A and a central portion B. Each outer member A may be provided with a longitudinal duct $a$ to house an electrical heating unit $a^1$ and the central portion may be separated from the outer members and provided with a heating unit in a duct $b$.

The central portion B is built up on refractory material $b^2$ and carried on a longitudinal beam $B^1$ adapted to be given a rectangular movement, i. e. a vertical lift followed by a longitudinal motion from the feed towards the delivery end of the furnace, a downward movement and a return longitudinal movement with its surface slightly below the level of the two outer members $A^1$ followed by a vertical lift to bring the central portion B again to its initial position. The duration of the period of movement to that of the stationary period may be of the order of 1:4 or any other suitable duration.

The beam B is provided with fins $b^3$ projecting into sand seals $a^3$ arranged on projections $a^4$ extending longitudinally of the kiln, the fins and sand seal preventing the loss of heat from the furnace and the entry of air through the clearances between the central portion B and the other members A.

Figure 6:
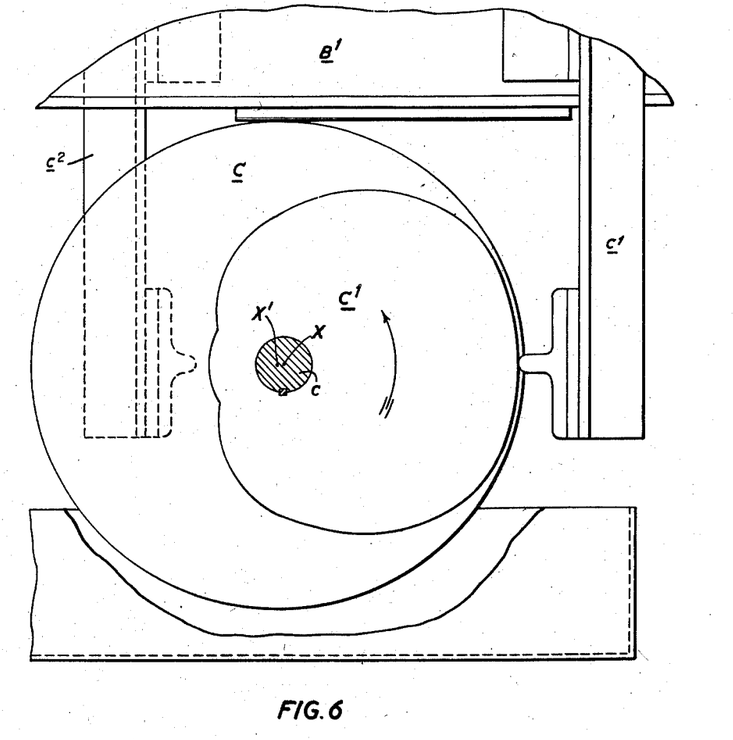
Fig. 6 is an enlarged detail view of the lifting and propelling cams.

The central portion B and beam $B^1$ are supported at each end of the kiln on lifting cams C mounted on shafts $c$. The shaft $c$ at one end also carries a propelling cam $C^1$ engaged by a follower plate $c^1$ affixed to the beam. A second cam $C^2$ similar to the cam $C^1$ and a follower plate $c^2$ normally out of contact with the latter cam may be provided to assist in controlling the return of the beam, such follower plate $c^2$ being retained in contact with the propelling cam $C^1$ on the return stroke during the rotation of the lifting cams C since the beam travels back in the opposite direction to that of the rotation of the lifting cams. In Fig. 6, $x$ designates the center of the shaft $c$ and $x^1$ designates the center of the cam C which is eccentric to the shaft $c$.

Slits $b^4$ may be provided in the upper flange of the beam to allow for expansion and contraction thereof. One or more exhaust vents $a^5$ may also be provided to allow for escape of any gases generated during the heating of the articles.

The shafts $c$ and cams C, $C^1$, $C^2$ are driven through worm gearing $c^3$ and reduction gearing $c^4$ on a shaft $c^6$ from an electric motor $c^5$. The electric motor $c^5$ may be driven intermittently from a time or other switch to traverse the beam periodically.

Figure 7:
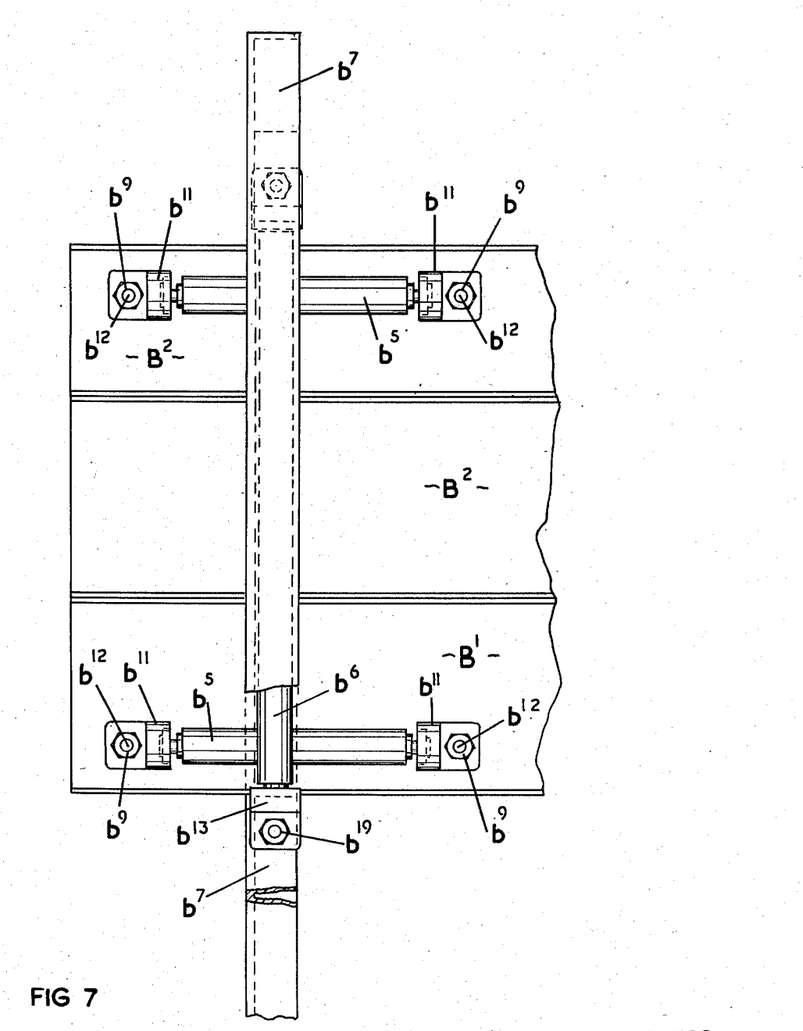
Fig. 7 is an enlarged detail view of the guide rollers and adjusting means for the beam.
Figure 8:
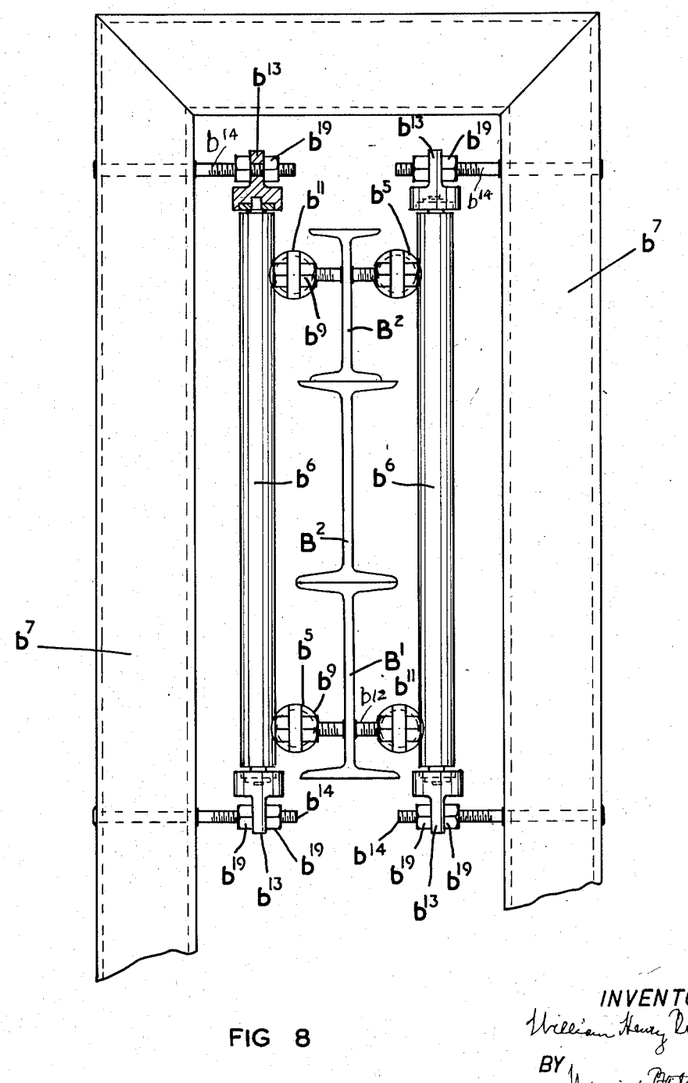
Fig. 8 is a view similar to Fig. 7, but taken at right angles thereto.

The beam $B^1$ at its ends is stiffened by fins $b^1$ welded or otherwise secured to the web and also by I section members $B^2$ bolted to the upper flange. One I section member and the beam carrying pairs of horizontal guide rollers $b^5$ engaging vertical rollers $b^6$ adjustably mounted in end frames or steadies $b^7$ whereby any warping or cut of truth of the beam may be compensated. The alignment of the beam $B^1$ and of the I-section members $B^2$ bolted thereto is adjusted by varying the relative positions of the rollers $b^5$ and $b^6$. The rollers $b^5$ are mounted in bearings $b^{11}$ carried on screw-threaded rods $b^{12}$ passing through the web of the beam $B^1$ and the web of one member $B^2$, and are adjusted by lock nut $b^9$. The rollers $b^5$ engage the vertical rollers $b^6$ carried in bearings $b^{13}$ mounted on screw-threaded rods $b^{14}$ passing through the end frame $b^7$, the rollers $b^6$ being adjusted by lock nuts $b^{19}$.

The tiles or other articles to be passed through a heating chamber D in the kilns are arranged to span the central portion B of the base to rest on the two outer portions $A^2$ thereof. The articles are lifted vertically by the central portion B through the cams C and traversed a predetermined distance along the kiln by the cams $C^1$ and are then lowered onto the two outer portions $A^1$ whilst the central portion B returns with its upper surface below the level of the portion $A^2$. The duration of the movement of the central portion B relatively to the duration of its stationary period may be of the order of one to four or other suitable relative periods, the moving period being reduced to a minimum to allow the article to be unsupported over its full area for as short a period of time as possible.

The heated space in the tunnel in height and width is reduced to a minimum subject to the size and shape of the article and for a tile is such that the tile may be therein and be lifted clear of the outer members for longitudinal movement.

The contours of the cams C are such that the lifting cam C comes into operation in advance of the propelling cam $C^1$ and after the lifting cam has lowered the beam the propellor cam $C^1$ returns the beam $B^1$ and the lifting cams C then raise it again into its initial position with the central portion B in line with the outer members of the base $A^2$.

Figure 1:
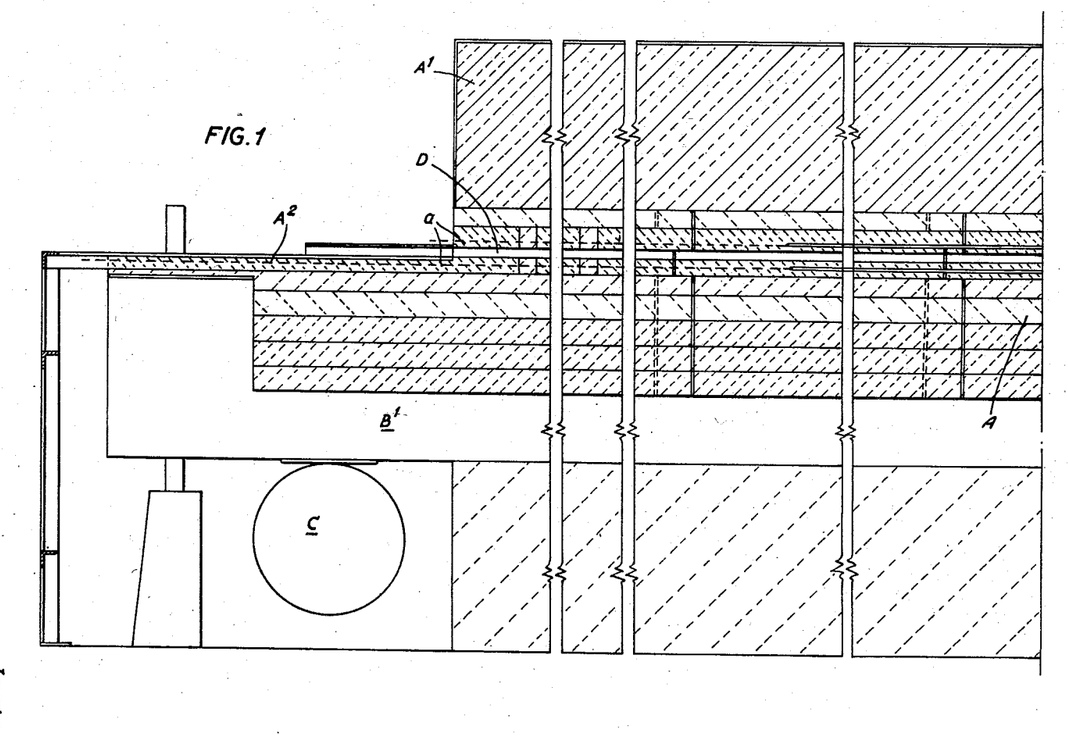
Figs. 1 and 1a are a longitudinal section through a tunnel kiln.
Figure 1A:
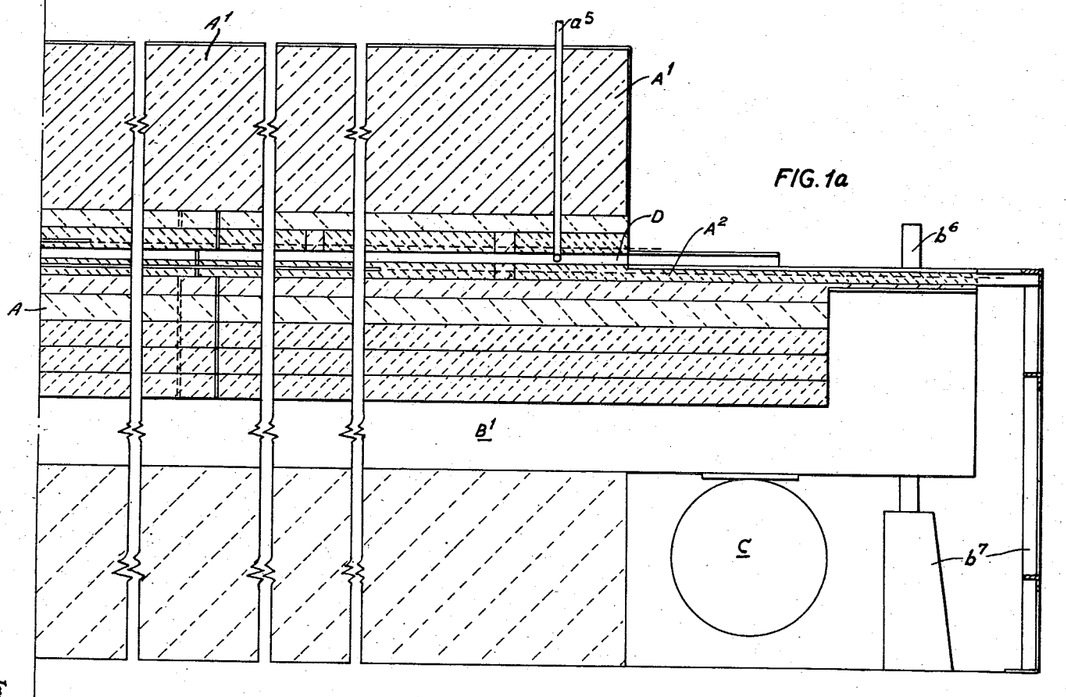
Figure 2:
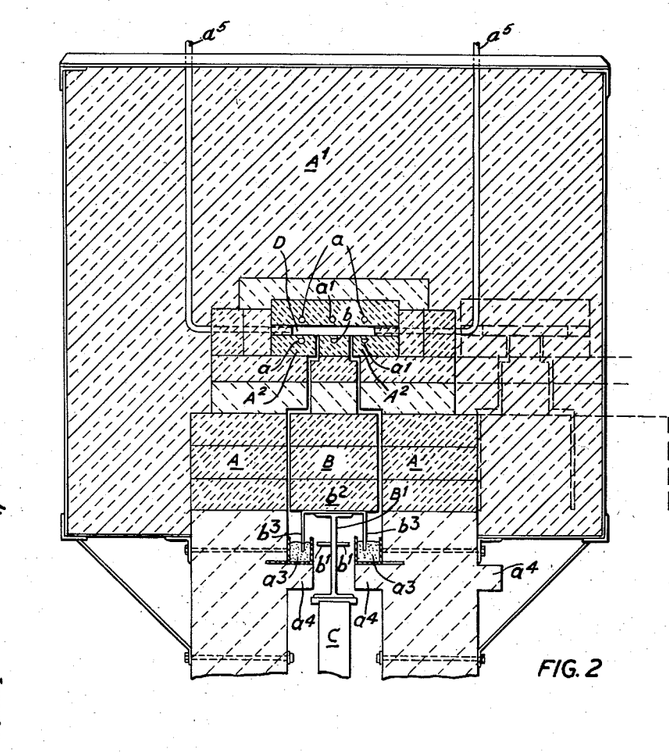
Fig. 2 is a transverse section of same.
Figure 3:
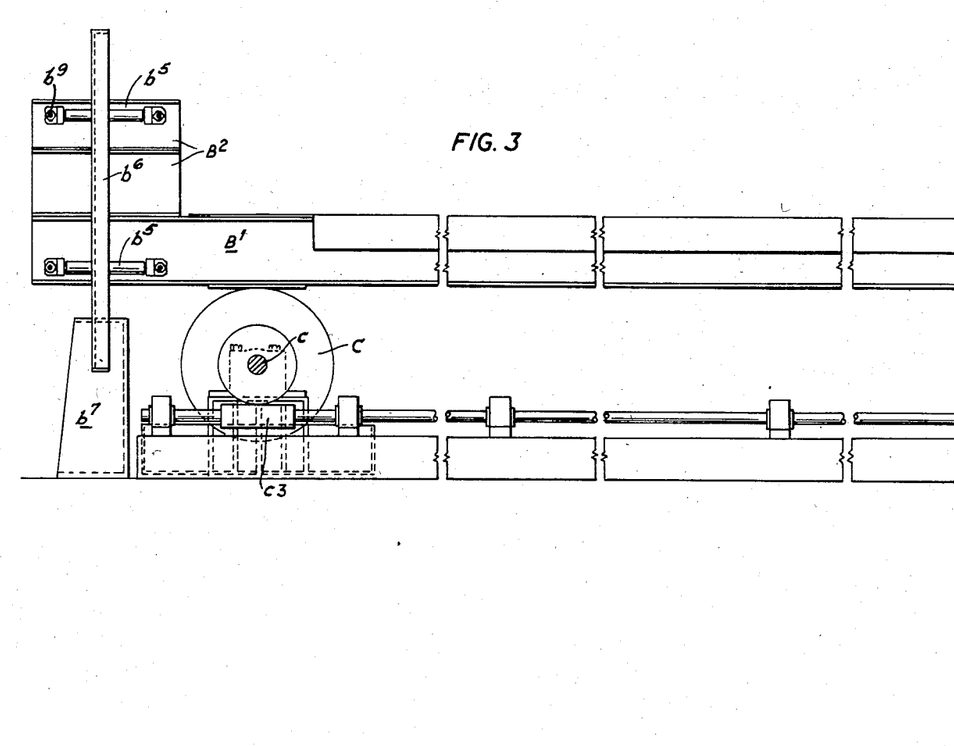
Figs. 3 and 3a are a side elevation of the beam and the lifting and propelling mechanism therefor.
Figure 3A:
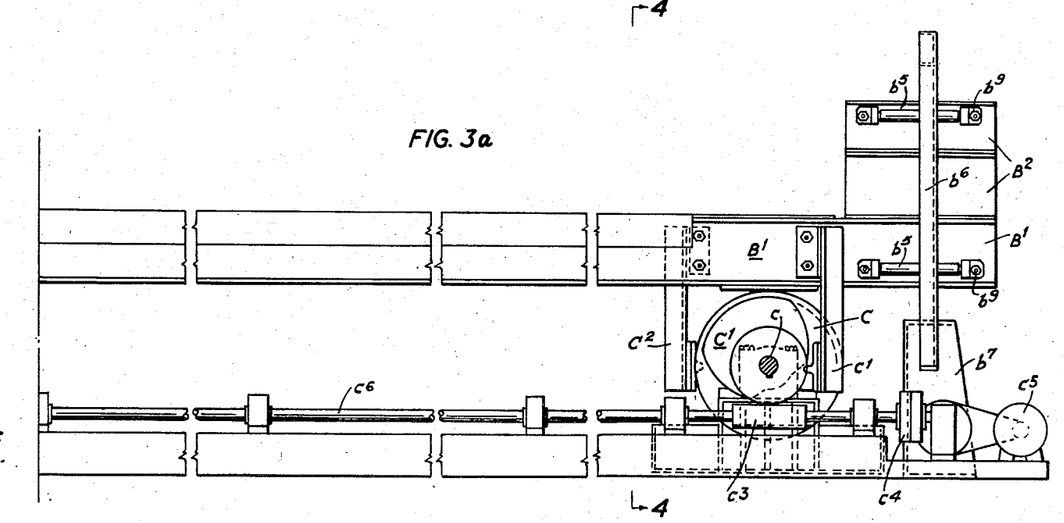
Figure 4:
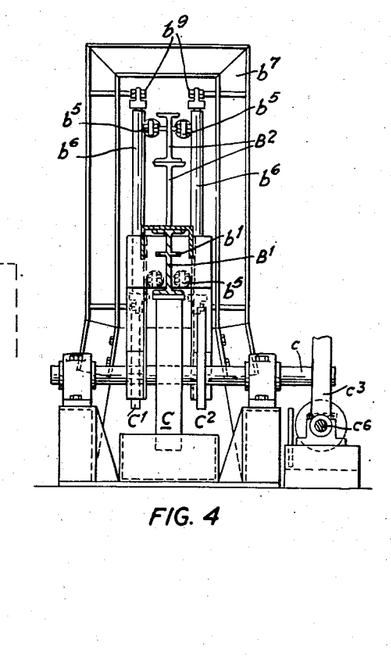
Fig. 4 is a transverse section on line 4—4.
Figure 5:
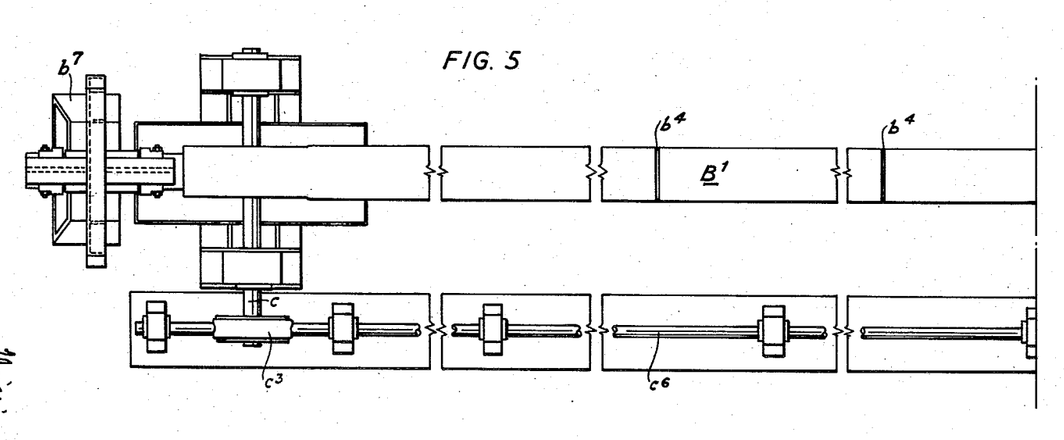
Figure 5A:
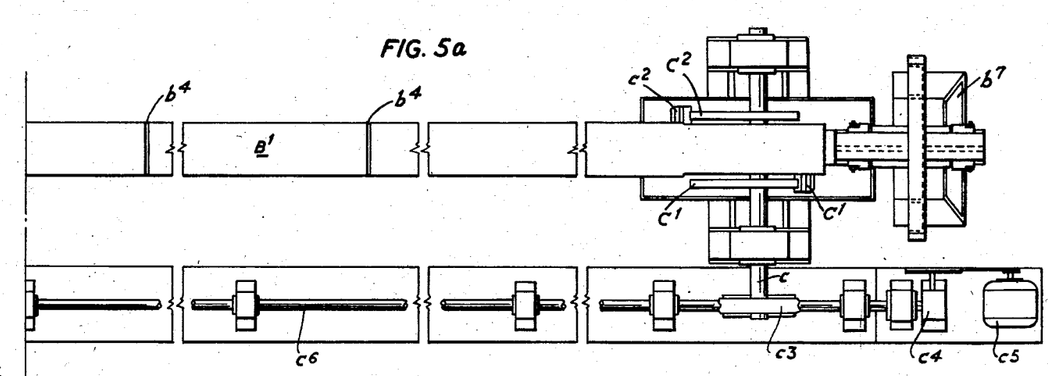

A number of furnaces may be arranged in banks each firing the same or differing tiles or other articles and each controlled by independent thermostatic devices. A further kiln may be arranged alongside as shown in dotted lines in Fig. 2 by introducing a second beam and cam on the right of the sand seal projection $a^4$.

I claim:

1. Conveying means comprising a beam for advancing articles supported thereon, a rotatable lifting cam on which the beam rests and acting on the beam during part of the rotation of said cam to sequentially lift and advance the beam, a rotatable propelling cam and means cooperative therewith for operatively connecting it to the beam, and means for rotating said cams in one direction, the propelling cam being timed relatively to the lifting cam to operate during part of its rotation to control the speed of advance of the beam while the latter is lifted and advanced by the lifting cam and to reciprocate the beam in the reverse direction and opposite to the direction of rotation of the lifting cam during another part of the rotation of the propelling cam.

2. Conveying means comprising a beam for advancing articles supported thereon, a rotatable lifting cam on which the beam rests frictionally for lifting and advancing the beam, a rotatable propelling cam means connected to the lifting cam to rotate synchronously therewith, cam followers connected to the beam and cooperative with said cam means for reciprocating the beam, and means for rotating the lifting cam and the propelling cam means in the same direction, the lifting cam being timed to lift and advance the beam in advance of the operation of the propelling cam means to control the speed of advance of the beam in one direction and to lower the beam in advance of the operation of the propelling cam means to reciprocate the beam in the opposite direction.

3. Conveying means comprising a reciprocatory beam for advancing articles thereon, superposed members of I-section secured to the beam, horizontal guide rollers journaled respectively on the sides of one of said members and on the sides of the beam and extending longitudinally of the beam, vertical guide rollers journaled at opposite sides of the beam and engageable by said horizontal rollers, and means for adjusting the vertical rollers in a direction transversely of the beam.

References Cited in the file of this patent

UNITED STATES PATENTS

| | | |
|---|---|---|
| 763,892 | Hirschmann | June 28, 1904 |
| 1,272,918 | Cram | July 16, 1918 |
| 1,400,367 | McCann | Dec. 13, 1921 |
| 2,026,172 | Holm | Dec. 31, 1935 |
| 2,045,920 | Parmelee | June 30, 1936 |
| 2,122,200 | Fourment | June 28, 1938 |
| 2,279,511 | Gottignies et al. | Apr. 14, 1942 |
| 2,320,172 | Brooke et al. | May 25, 1943 |

FOREIGN PATENTS

| | | |
|---|---|---|
| 395,617 | Great Britain | July 20, 1933 |